US012774731B2

(12) United States Patent
Hakoishi et al.

(10) Patent No.: US 12,774,731 B2
(45) Date of Patent: Oct. 27, 2026

(54) BUMPER CAP AND SHOCK ABSORBER

(71) Applicant: Hitachi Astemo, Ltd., Ibaraki (JP)

(72) Inventors: Takuya Hakoishi, Hitachinaka (JP); Shinichi Kagawa, Hitachinaka (JP); Eiichi Komori, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 427 days.

(21) Appl. No.: 18/274,456

(22) PCT Filed: Feb. 18, 2022

(86) PCT No.: PCT/JP2022/006543
§ 371 (c)(1),
(2) Date: Jul. 26, 2023

(87) PCT Pub. No.: WO2022/181463
PCT Pub. Date: Sep. 1, 2022

(65) Prior Publication Data
US 2024/0093751 A1 Mar. 21, 2024

(30) Foreign Application Priority Data
Feb. 24, 2021 (JP) ................................. 2021-027197

(51) Int. Cl.
*F16F 9/38* (2006.01)
*F16F 9/32* (2006.01)

(52) U.S. Cl.
CPC ..................................... *F16F 9/32* (2013.01)

(58) Field of Classification Search
CPC ..................................... F16F 9/32; F16F 9/36
See application file for complete search history.

(56) References Cited

U.S. PATENT DOCUMENTS 6,199,844 B1 * 3/2001 McCormick ....... B60G 21/0551 267/221
7,810,619 B2 * 10/2010 Maeda ...................... F16F 9/58 188/322.17
(Continued)

FOREIGN PATENT DOCUMENTS

CN 1260496 C 6/2006
CN 104074909 B 8/2017
(Continued)

OTHER PUBLICATIONS

Korean Office Action received in corresponding Korean Application No. 10-2023-7016386 dated Nov. 12, 2024.
(Continued)

*Primary Examiner* — Thomas W Irvin
(74) *Attorney, Agent, or Firm* — MATTINGLY & MALUR, PC

(57) ABSTRACT

Provided is a bumper cap to be attached to a shock absorber main body, and includes a cover part having an opening at one end, having a bottom part and a through hole penetrating the bottom part at another end, and configured to cover the shock absorber main body, and a plurality of protruding parts protruding from the bottom part of the cover part toward the opening side, and in which a gap is formed between the adjacent protruding parts, in which a suppression part configured to suppress a rotation of a fluid, which has flowed into a space between the inside of the cover part and the shock absorber main body from an outside of the cover part through the through hole, in the cover part is further provided.

6 Claims, 6 Drawing Sheets

(56) References Cited

U.S. PATENT DOCUMENTS

| | | | | |
|---|---|---|---|---|
| 9,022,188 | B2 * | 5/2015 | Lee | F16F 9/36 188/322.17 |
| 9,829,062 | B2 * | 11/2017 | Tsunekawa | F16F 9/585 |
| 10,309,478 | B2 * | 6/2019 | Choi | F16F 9/3242 |
| 10,794,447 | B2 * | 10/2020 | Kato | F16F 9/32 |
| 10,816,055 | B2 * | 10/2020 | Górski | F16F 9/36 |
| 11,148,496 | B2 * | 10/2021 | Kwon | B60G 13/001 |
| 11,320,019 | B2 * | 5/2022 | Yasukouchi | B60G 13/005 |
| 11,566,679 | B2 * | 1/2023 | Görski | F16F 9/36 |
| 11,649,872 | B2 * | 5/2023 | Barton | F16F 9/3207 280/124.162 |
| 2002/0189441 | A1 * | 12/2002 | Collis | F16F 9/38 92/165 R |
| 2003/0183997 | A1 | 10/2003 | Saiki et al. | |
| 2004/0168871 | A1 * | 9/2004 | Handke | B60G 15/062 188/322.12 |
| 2006/0219506 | A1 * | 10/2006 | Zdeb | F16F 7/09 188/322.16 |
| 2007/0125611 | A1 | 6/2007 | Zara et al. | |
| 2009/0145707 | A1 * | 6/2009 | Henneberg | B60G 13/00 188/322.12 |
| 2014/0291086 | A1 | 10/2014 | Suzuki et al. | |
| 2016/0084336 | A1 * | 3/2016 | Tsunekawa | F16F 9/585 188/322.12 |
| 2018/0320752 | A1 * | 11/2018 | Kato | F16F 9/3242 |
| 2019/0293148 | A1 * | 9/2019 | Yasukouchi | F16F 9/32 |

FOREIGN PATENT DOCUMENTS

| | | | |
|---|---|---|---|
| EP | 4 075 013 | A1 | 10/2022 |
| JP | 2009-222223 | A | 10/2009 |
| JP | 2013-155841 | | 8/2013 |
| JP | 2016-061425 | A | 4/2016 |
| JP | 2017-096369 | A | 6/2017 |
| KR | 10-1162309 | B1 | 7/2012 |
| WO | 2017/010254 | A1 | 1/2017 |

OTHER PUBLICATIONS

International Search Report received in corresponding International Application No. PCT/JP2022/006543 dated Apr. 12, 2022.

Written Opinion of the International Searching Authority received in corresponding International Application No. PCT/JP2022/006543 dated Apr. 12, 2022.

Indian Office Action received in corresponding Indian Application No. 202317050509 dated Jun. 5, 2026.

* cited by examiner

BUMPER CAP AND SHOCK ABSORBER

TECHNICAL FIELD

The present invention relates to a bumper cap and a shock absorber.

Priority is claimed on Japanese Patent Application No. 2021-027197 filed on Feb. 24, 2021, the content of which is incorporated herein by reference.

BACKGROUND ART

Among shock absorbers, there is one in which a side of a cylinder from which a rod protrudes is covered with a bumper cap (see, for example, Patent Documents 1 and 2).

CITATION LIST

Patent Document

[Patent Document 1]

PCT International Publication No. WO 2017/010254

[Patent Document 2]

Japanese Unexamined Patent Application, First Publication No. 2016-061425

SUMMARY OF INVENTION

Technical Problem

It is desired to suppress generation of abnormal noise in a shock absorber.

Accordingly, an objective of the present invention is to provide a bumper cap and a shock absorber capable of suppressing generation of abnormal noise.

Solution to Problem

In order to achieve the above-described objective, one aspect of a bumper cap according to the present invention is to be attached to a shock absorber main body, and is configured to include: a cover part having an opening at one end, having a bottom part and a through hole penetrating the bottom part at another end, and configured to cover the shock absorber main body; and a plurality of protruding parts protruding from the bottom part of the cover part toward the opening side, and in which a gap is formed between the adjacent protruding parts, in which a suppression part configured to suppress a rotation of a fluid, which has flowed into a space between the inside of the cover part and the shock absorber main body from an outside of the cover part through the through hole, in the cover part is further provided.

Another aspect of the bumper cap according to the present invention is to be attached to a shock absorber main body, and is configured to include: a cover part having an opening at one end, having a bottom part and a through hole penetrating the bottom part at another end, and configured to cover the shock absorber main body; and a plurality of protruding parts protruding from the bottom part of the cover part toward the opening side and in which a gap is formed between the adjacent protruding parts, in which inclined parts inclined in a same direction with respect to a circumferential direction of the bottom part toward an inner diameter side of the bottom part are provided in the plurality of protruding parts provided on the bottom part.

One aspect of a shock absorber according to the present invention includes a cylinder and a rod extending from one end side of the cylinder, and is configured to further include a cover part in which a through hole through which the rod is inserted is formed and which covers one end side of the cylinder, a plurality of protruding parts protruding from an inner surface of the cover part at intervals in a circumferential direction of the cover part, and a fluid adjustment part configured to adjust a fluid having flowed into an inside of the cover part from an outside of the cover part through the through hole so that a velocity of the fluid extending outward in the circumferential direction of the through hole varies depending on positions in the circumferential direction of the through hole.

Advantageous Effects of Invention

According to the present invention, it is possible to suppress generation of abnormal noise.

DESCRIPTION OF EMBODIMENTS

First Embodiment

A first embodiment according to the present invention will be described below with reference to FIGS. 1 to 5.

Figure 1:
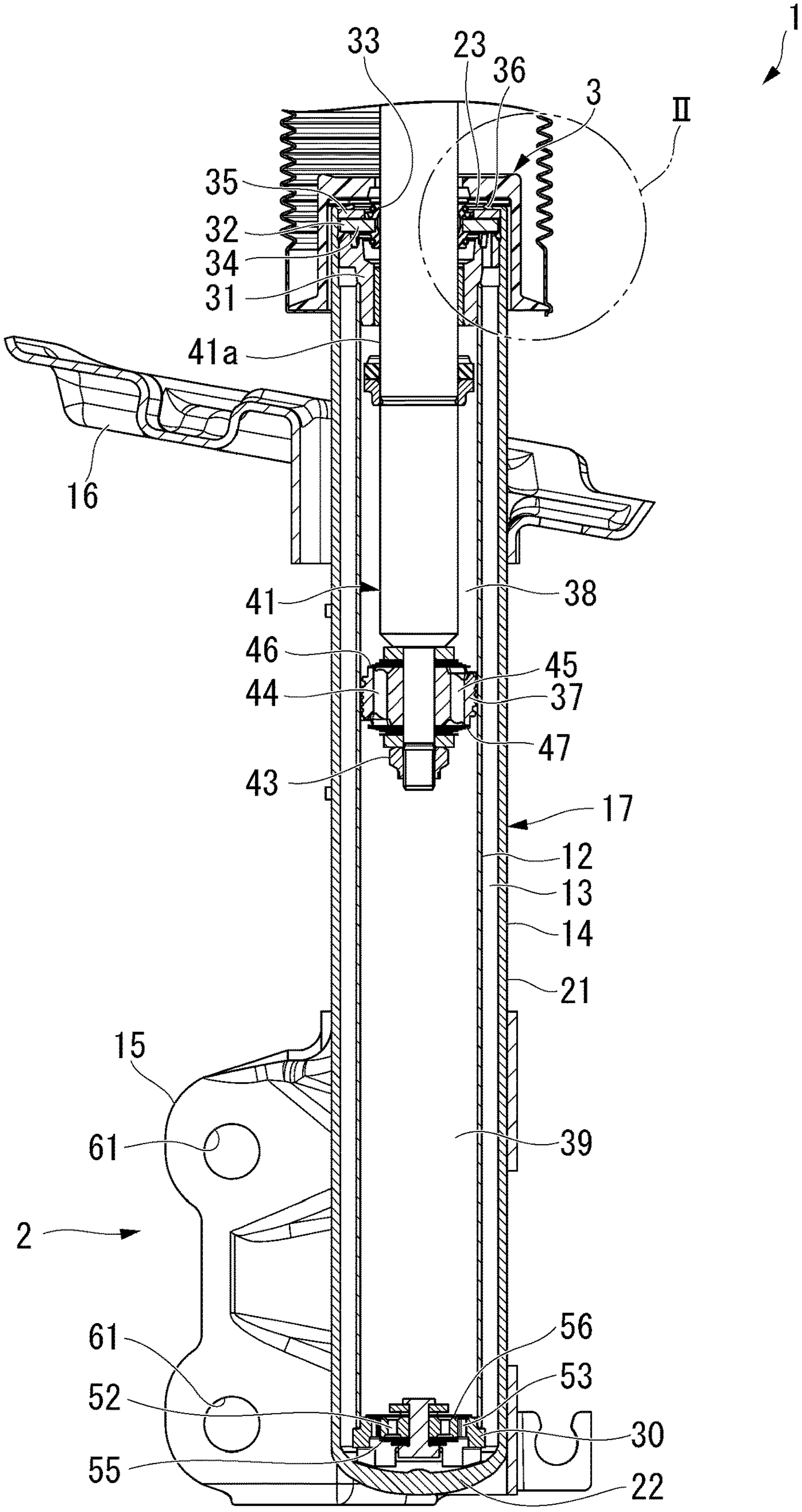
FIG. 1 is a cross-sectional view showing a shock absorber of a first embodiment according to the present invention.

FIG. 1 shows a shock absorber of the first embodiment. A shock absorber 1 of the first embodiment is a shock absorber used in a suspension device of a vehicle such as an automobile or a railway vehicle, and specifically, is a shock absorber used for a strut-type suspension of an automobile. The shock absorber 1 includes a shock absorber main body 2 and a bumper cap 3.

The shock absorber main body 2 includes a cylindrical inner tube 12 made of a metal, a bottomed cylindrical outer tube 14 made of a metal having a diameter larger than that of the inner tube 12 and provided on an outer circumferential side of the inner tube 12 to form a reservoir chamber 13 between itself and the inner tube 12, and a main bracket 15 and a spring seat 16 that are made of a metal and are both fixed to an outer circumferential side of the outer tube 14 by welding. The inner tube 12 and the outer tube 14 constitute a cylinder 17 having a cylindrical shape. The outer tube 14 includes a cylindrical side wall part 21, a bottom part 22 closing one end side of the side wall part 21 in an axial direction, and an opening 23 on a side of the side wall part 21 opposite to the bottom part 22.

The shock absorber main body 2 includes an annular body member 30 made of a metal attached to one end portion of the inner tube 12 in the axial direction and an annular rod guide 31 made of a metal attached to the other end portion of the inner tube 12 in the axial direction. The inner tube 12 is engaged with the bottom part 22 of the outer tube 14 via the body member 30, and is fitted to the opening 23 side of the side wall part 21 of the outer tube 14 via the rod guide 31.

Figure 2:
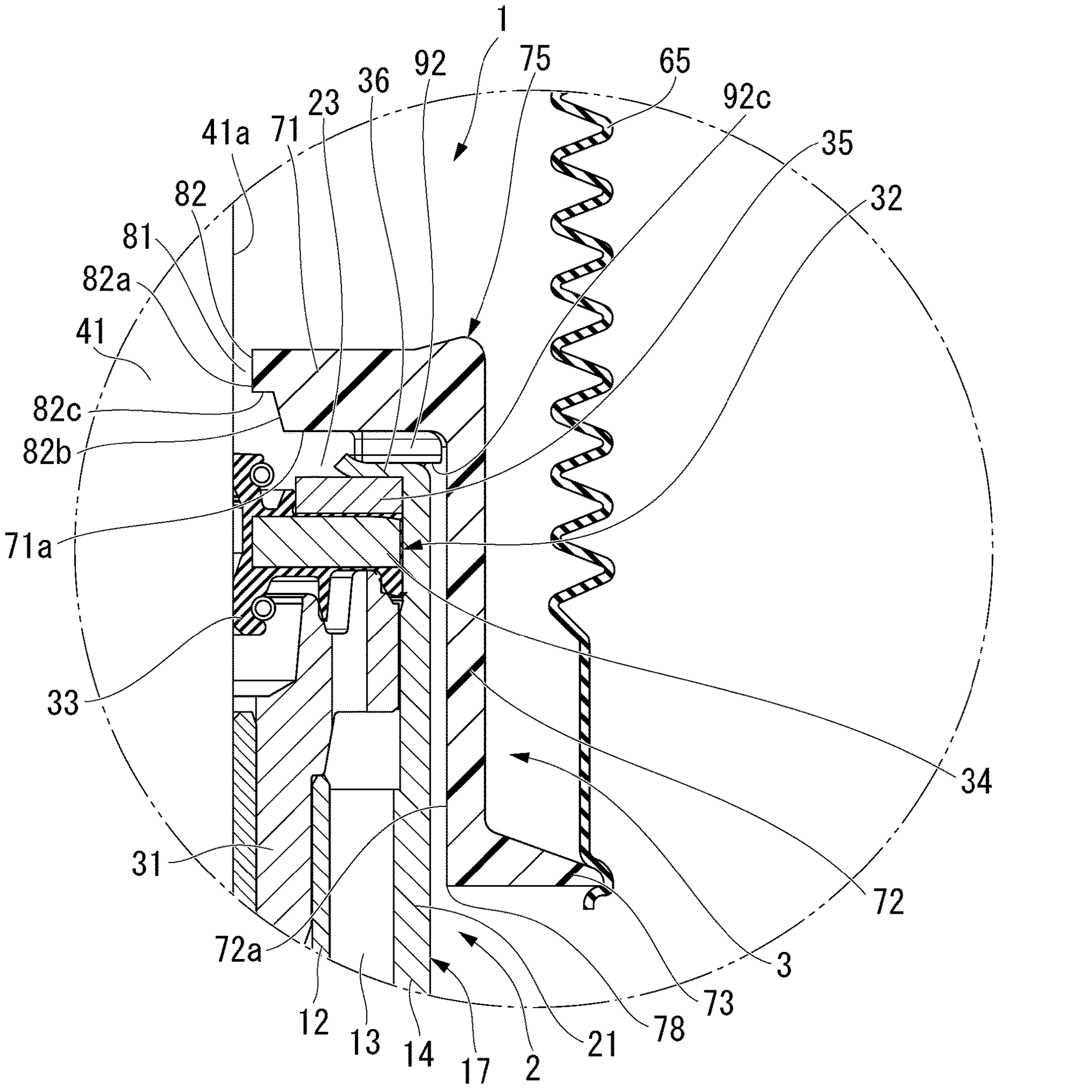
FIG. 2 is an enlarged cross-sectional view of part II, shown in FIG. 1, of the shock absorber of the first embodiment according to the present invention.

The shock absorber main body 2 includes an annular seal member 32 on a side opposite to the bottom part 22 with respect to the rod guide 31. The seal member 32 is constructed by embedding an annular rigid member 34 made of a metal in an elastic member 33 made of rubber as shown in FIG. 2. The seal member 32 is fitted to an inner circumferential portion of the side wall part 21 on the opening 23 side. The shock absorber main body 2 includes an annular ring member 35 made of a metal on the opening 23 side of the seal member 32. A locking part 36 plastically deformed inward in a radial direction by curling processing is formed at an end portion of the side wall part 21 on the opening 23 side, and the seal member 32 is sandwiched between the locking part 36 and the rod guide 31 via the ring member 35 at a portion in which the rigid member 34 is embedded.

As shown in FIG. 1, the shock absorber main body 2 includes a piston 37 fitted in the inner tube 12 to be slidable. The piston 37 defines a first chamber 38 and a second chamber 39 in the inner tube 12. The first chamber 38 is provided between the piston 37 and the rod guide 31 inside the inner tube 12, and the second chamber 39 is provided between the piston 37 and the body member 30 inside the inner tube 12. The second chamber 39 is divided from the reservoir chamber 13 by the body member 30. The first chamber 38 and the second chamber 39 in the inner tube 12 are filled with an oil fluid serving as a working fluid, and the reservoir chamber 13 between the inner tube 12 and the outer tube 14 is filled with a gas and the oil fluid serving as a working fluid.

The shock absorber main body 2 includes a columnar rod 41 made of a metal, one side of which is coupled to the piston 37 and the other side of which extends from the outer tube 14 to the outside through the opening 23. Therefore, the rod 41 extends from one end side of the cylinder 17. The rod 41 is connected to the piston 37 by a nut 43 and moves integrally with the piston 37 with respect to the cylinder 17. The rod 41 extends to the outside from the cylinder 17 through the rod guide 31 and the elastic member 33 of the seal member 32 as shown in FIG. 2. A portion of the rod 41 that extends to the outside from the outer tube 14 is connected to a vehicle body side. The rod 41 is guided by the rod guide 31 to move in the axial direction with respect to the cylinder 17. The elastic member 33 of the seal member 32 closes a gap between itself and the side wall part 21 and closes a gap between itself and the rod 41. Therefore, the seal member 32 closes a space between the outer tube 14 and the rod 41 to restrict leakage of the oil fluid in the inner tube 12 and the gas and the oil fluid in the reservoir chamber 13 to the outside.

As shown in FIG. 1, a passage 44 and a passage 45 penetrating in the axial direction are formed in the piston 37. The passages 44 and 45 allow communication between the first chamber 38 and the second chamber 39. The shock absorber main body 2 includes an annular disc valve 46 capable of closing the passage 44 by coming into contact with the piston 37 on a side of the piston 37 opposite to the bottom part 22. Also, the shock absorber main body 2 includes an annular disc valve 47 capable of closing the passage 45 by coming into contact with the piston 37 on the bottom part 22 side of the piston 37.

The disc valve 46 opens the passage 44 when the rod 41 moves to a compression side that increases an amount of entry into the inner tube 12 and the outer tube 14 to move the piston 37 in a direction in which the second chamber 39 is reduced and a pressure in the second chamber 39 becomes higher than a pressure in the first chamber 38 by a predetermined value or more, and serves as a compression-side damping valve that generates a damping force at that time. A fixed orifice (not shown) that allows the first chamber 38 and the second chamber 39 to communicate with each other via the passage 44 even in a state in which the disc valve 46 has closed the passage 44 to the maximum is formed in at least one of the piston 37 and the disc valve 46.

The disc valve 47 opens the passage 45 when the rod 41 moves to an extension side that increases an amount of protrusion from the inner tube 12 and the outer tube 14 to move the piston 37 in a direction in which the first chamber 38 is reduced and a pressure in the first chamber 38 becomes higher than a pressure in the second chamber 39 by a predetermined value or more, and serves as an extension-side damping valve that generates a damping force at that time. A fixed orifice (not shown) that allows the first chamber 38 and the second chamber 39 to communicate with each other via the passage 45 even in a state in which the disc valve 47 has closed the passage 45 to the maximum is formed in at least one of the piston 37 and the disc valve 47.

A passage 52 and a passage 53 penetrating in the axial direction are formed in the body member 30. The passages 52 and 53 allow communication between the second chamber 39 and the reservoir chamber 13. The shock absorber main body 2 includes an annular disc valve 55 capable of closing the passage 52 by coming into contact with the body member 30 on the bottom part 22 side of the body member 30, and an annular disc valve 56 capable of closing the passage 53 by coming into contact with the body member 30 on a side of the body member 30 opposite to the bottom part 22.

The disc valve 55 opens the passage 52 when the rod 41 moves to the compression side to move the piston 37 in a direction in which the second chamber 39 is reduced and a pressure in the second chamber 39 becomes higher than a pressure in the reservoir chamber 13 by a predetermined value or more, and serves as a compression-side damping valve that generates a damping force at that time. The disc valve 56 opens the passage 53 when the rod 41 moves to the extension side to move the piston 37 to the first chamber 38 side and a pressure in the second chamber 39 becomes lower than a pressure in the reservoir chamber 13, but serves as a suction valve that allows a working fluid to flow from the reservoir chamber 13 into the second chamber 39 at that time without substantially generating a damping force.

The main bracket 15 is made of a metal and is fixed by being fitted and welded to the side wall part 21 on the bottom part 22 side with respect to a central position of the outer tube 14 in the axial direction. The main bracket 15 is connected to a wheel (not shown) side with fasteners (not shown) inserted into a plurality of attachment holes 61.

The spring seat 16 is made of a metal and is fixed by being fitted and welded to the side wall part 21 on the opening 23 side with respect to the central position of the outer tube 14 in the axial direction. The spring seat 16 supports a lower end of a vehicle body support spring (not shown) which is a coil spring that supports the vehicle body (not shown).

As shown in FIG. 2, the bumper cap 3 is attached to the shock absorber main body 2 to cover one end portion of the cylinder 17 on a side from which the rod 41 protrudes. Here, the shock absorber main body 2 includes the seal member 32 at an outer end portion of the cylinder 17 on a side from which the rod 41 protrudes, and the bumper cap 3 protects the seal member 32. Specifically, a cylindrical bump rubber (not shown) is provided on an outer circumferential side of a portion of the rod 41 that protrudes outward from the seal member 32, and when the cylinder 17 reduces a distance from the vehicle body (not shown), the bump rubber comes into contact with the vehicle body and the bumper cap 3 and elastically deforms to absorb the impact. At that time, the bumper cap 3 restricts a collision between the bump rubber and the seal member 32.

A bellows cylindrical-shaped dust boot 65 extends downward from the vehicle body (not shown) to cover a portion of the rod 41 protruding outward from the seal member 32 from an outer circumferential side. A lower end portion of the dust boot 65 is fixed to the bumper cap 3. The dust boot 65 covers at least a portion of the rod 41 from the outer circumferential side, and also covers the above-described bump rubber (not shown) and bumper cap 3 from the outer circumferential side. The above-described vehicle body support spring (not shown) is disposed on an outer circumferential side of the dust boot 65.

Figure 3:
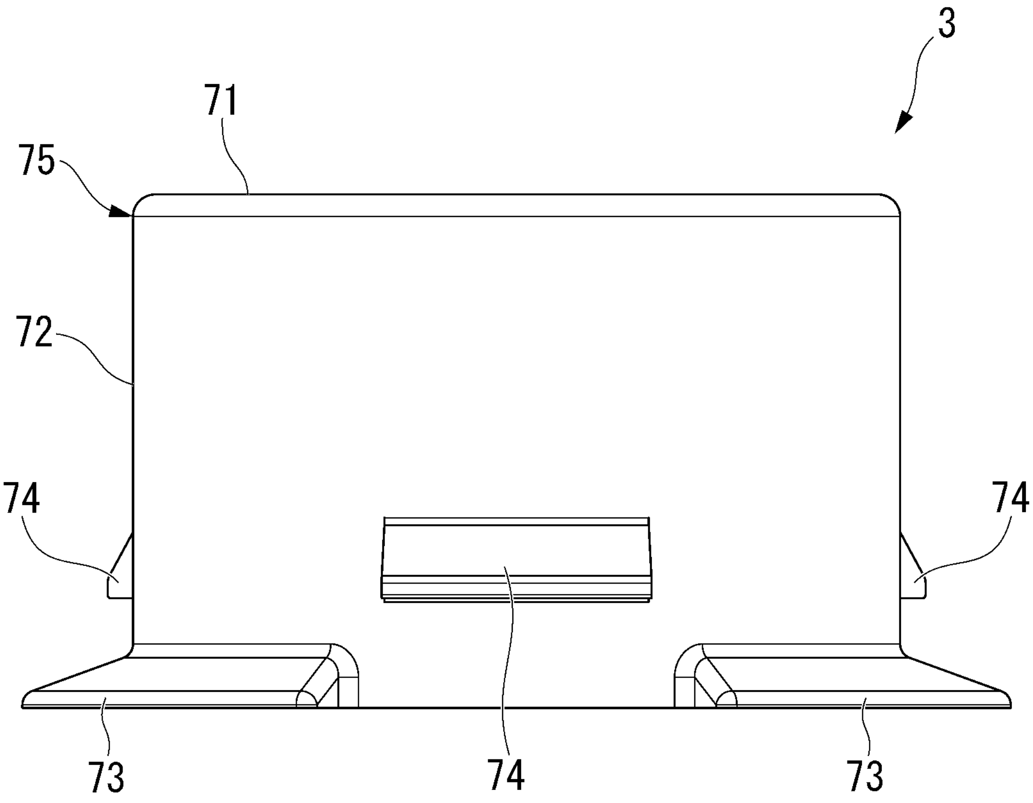
FIG. 3 is a front view showing a bumper cap of the first embodiment according to the present invention.
Figure 4:
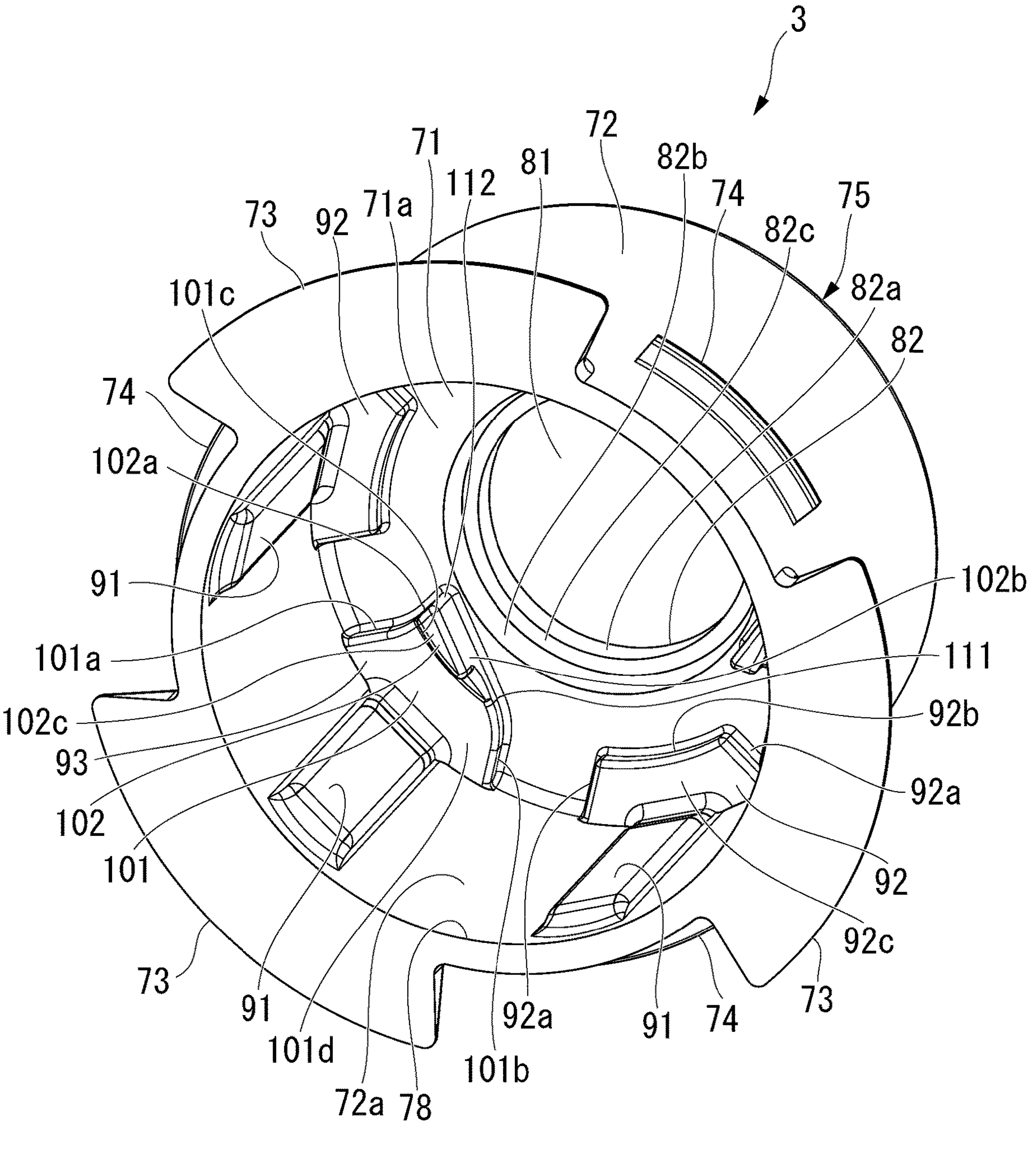
FIG. 4 is a perspective view showing the bumper cap of the first embodiment according to the present invention.
Figure 5:
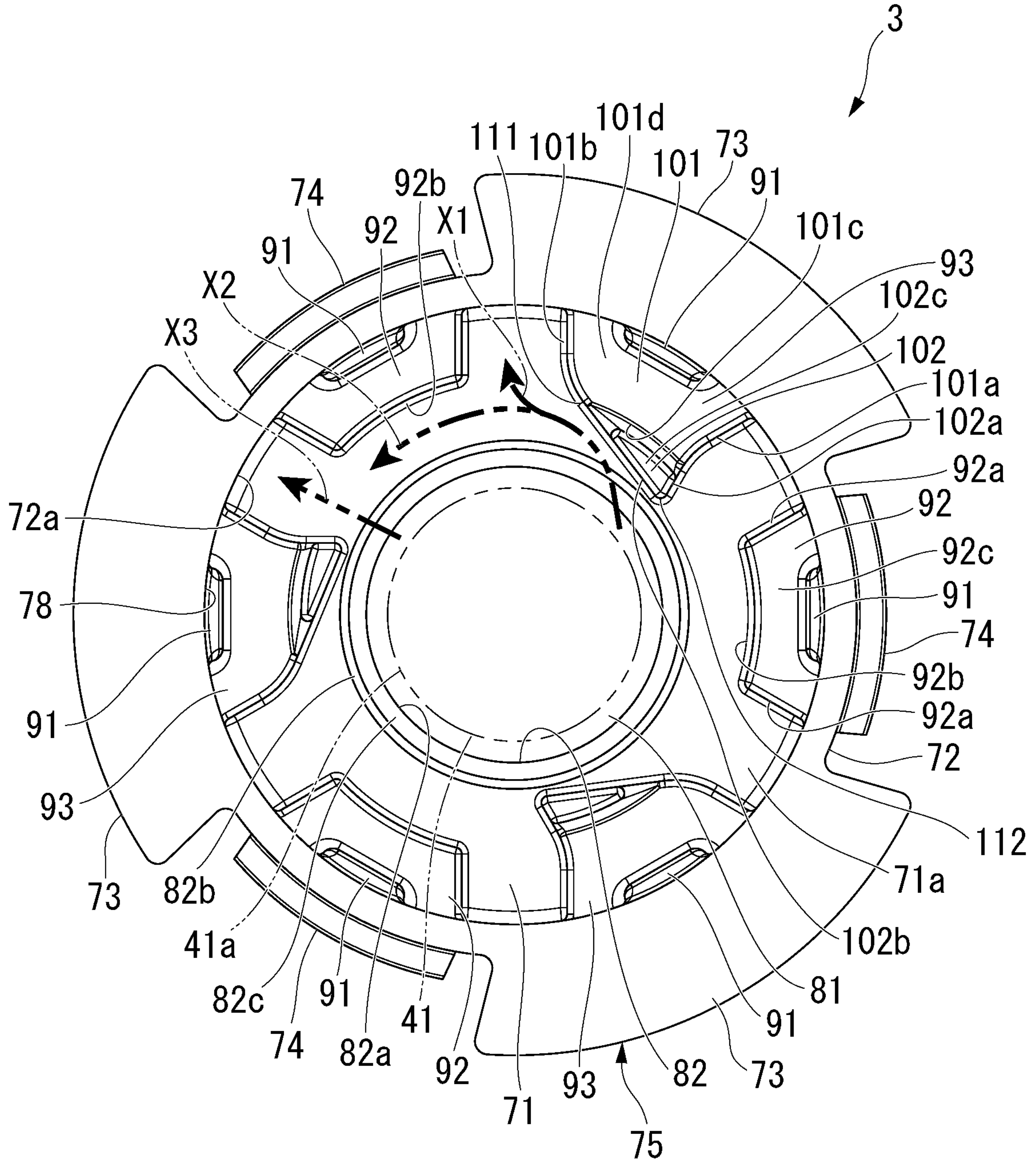
FIG. 5 is a bottom view showing the bumper cap of the first embodiment according to the present invention.

The bumper cap 3 is an integrally molded product made of a synthetic resin and includes a cover part 75 having a bottom part 71, a barrel part 72, a flange part 73, and an outward protruding part 74 as shown in FIGS. 3 to 5.

As shown in FIGS. 4 and 5, the bottom part 71 has a bored disc shape, and has a through hole 81 formed to penetrate in the axial direction at a center in the radial direction. The through hole 81 is a round hole having a circular cross-section on a plane orthogonal to a central axis thereof. In other words, in the bottom part 71, an inner circumferential edge portion 82 forming the through hole 81 has a circular shape. As shown in FIG. 2, in the inner circumferential edge portion 82 of the bottom part 71, an inner circumferential end surface 82*a* is formed at one end portion of the bottom part 71 in the axial direction, a tapered surface 82*b* having a larger diameter than the inner circumferential end surface 82*a* is formed at the other end portion of the bottom part 71 in the axial direction, and a stepped surface 82*c* connecting them is formed therebetween.

The inner circumferential end surface 82*a* has a cylindrical surface shape and has a smallest diameter in the inner circumferential edge portion 82. The stepped surface 82*c* has a planar shape extending outward in the radial direction from an end edge portion of the inner circumferential end surface 82*a* on the tapered surface 82*b* side in the axial direction. The tapered surface 82*b* extends from an outer circumferential edge portion of the stepped surface 82*c* to a side opposite to the inner circumferential end surface 82*a* in the axial direction, and becomes larger in diameter with distance away from the inner circumferential end surface 82*a*. The inner circumferential end surface 82*a*, the tapered surface 82*b* and the stepped surface 82*c* are coaxially formed to form the through hole 81.

The barrel part 72 has a cylindrical shape and extends coaxially with the bottom part 71 from the entire circumference of the outer circumferential edge portion of the bottom part 71 to a side of the bottom part 71 opposite to the inner circumferential end surface 82*a* in the axial direction. The barrel part 72 has an opening 78 on a side opposite to the bottom part 71 in the axial direction. An inner surface 71*a* of the bottom part 71 on the barrel part 72 side in the axial direction has a planar shape that extends in a direction orthogonal to an axis of the bottom part 71 and the barrel part 72. An inner circumferential surface 72*a* of the barrel part 72 has a cylindrical surface shape. The cover part 75 has the opening 78 at one end, and a bottom part 71 and a through hole 81 penetrating the bottom part 71 at the other end.

Here, the central axis of the through hole 81, the bottom part 71, and the barrel part 72, which are coaxially disposed, are referred to as a central axis of the bumper cap 3 and the cover part 75. Therefore, the through hole 81, the bottom part 71, the barrel part 72, the bumper cap 3, and the cover part 75 are aligned in the axial direction, also aligned in a circumferential direction, and also aligned in the radial direction.

The flange part 73 extends outward in the radial direction of the barrel part 72 from an end edge portion of the barrel part 72 on a side opposite to the bottom part 71 in the axial direction. As shown in FIG. 4, the flange part 73 is partially provided in the circumferential direction of the barrel part 72, and a plurality, specifically three, of flange parts 73 having the same shape are provided at regular intervals in the circumferential direction of the barrel part 72. As shown in FIG. 3, the outward protruding part 74 protrudes outward in the radial direction from between the bottom part 71 and the flange parts 73 in the axial direction of the barrel part 72. As shown in FIG. 5, the outward protruding part 74 is partially provided in the circumferential direction of the barrel part 72, and a plurality, specifically three, of outward protruding parts 74 having the same shape are provided at regular intervals in the circumferential direction of the barrel part 72. The outward protruding parts 74 are positioned differently from the flange parts 73 in the circumferential direction of the barrel part 72. The outward protruding parts 74 and the flange parts 73 are alternately disposed at regular intervals in the circumferential direction of the barrel part 72.

The bumper cap 3 includes a plurality, specifically six, of fitting protruding parts 91 having the same shape, a plurality, specifically three, of contact protruding parts 92 (protruding parts) having the same shape, and a plurality, specifically three, of inclined protruding parts 93 (protruding parts) having the same shape. The fitting protruding parts 91 are provided on the barrel part 72 of the cover part 75, and the contact protruding parts 92 and the inclined protruding parts 93 are provided on the bottom part 71 and the barrel part 72 of the cover part 75.

As shown in FIG. 4, the fitting protruding parts 91 protrude inward in the radial direction of the barrel part 72 from the inner circumferential surface 72*a* of the barrel part 72. The fitting protruding parts 91 are partially provided in the circumferential direction of the barrel part 72, and the fitting protruding parts 91 having the same shape are provided at regular intervals in the circumferential direction of the barrel part 72. Therefore, a gap is formed between adjacent fitting protruding parts 91 in the circumferential direction of the barrel part 72.

The contact protruding parts 92 protrude from the inner surface 71*a* of the bottom part 71 toward the opening 78 side in the axial direction of the barrel part 72. The inclined protruding parts 93 also protrude from the inner surface 71*a* of the bottom part 71 toward the opening 78 side. The contact protruding parts 92 and the inclined protruding parts 93 are alternately disposed at regular intervals in the circumferential direction of the bottom part 71 and the barrel part 72. The plurality of contact protruding parts 92 and the plurality of inclined protruding parts 93 form gaps each formed between adjacent contact protruding part 92 and inclined protruding part 93 in the circumferential direction of the barrel part 72. All the contact protruding parts 92 and all the inclined protruding parts 93 are each connected to one fitting protruding part 91 while their positions in the circumferential direction of the bottom part 71 are aligned.

The contact protruding part 92 includes a pair of side wall surfaces 92*a* and an inner wall surface 92*b* both rising from the inner surface 71*a* of the bottom part 71 in the axial direction of the barrel part 72, and a contact surface 92*c* extending by connecting end edge portions of the pair of side wall surfaces 92*a* and the inner wall surface 92*b* on a side opposite to the inner surface 71*a* in the axial direction of the barrel part 72.

Both the pair of side wall surfaces 92*a* have a planar shape and extend radially inward in the radial direction of the barrel part 72 from the inner circumferential surface 72*a* of the barrel part 72. The inner wall surface 92*b* connects end edge portions of the pair of side wall surfaces 92*a* on the central axis side in the radial direction of the barrel part 72. The inner wall surface 92*b* has a shape of a part of a cylindrical surface that is coaxial with the inner circumferential surface 72*a* of the barrel part 72. The inner wall surfaces 92*b* of all the contact protruding parts 92 form a shape of a part of the same cylindrical surface that is coaxial with the inner circumferential surface 72*a* of the barrel part 72. The contact surface 92*c* extends parallel to the inner surface 71*a* of the bottom part 71. The fitting protruding part 91 extending from the contact protruding part 92 extends to the opening 78 side in the axial direction of the barrel part 72 from a central position of the contact surface 92*c* in the circumferential direction of the barrel part 72.

The inclined protruding part 93 includes a contact part 101 connected to the inner circumferential surface 72*a* of the barrel part 72, and an inclined part 102 (suppression part, fluid adjustment part) protruding from the contact part 101 to the central axis side of the barrel part 72.

The contact part 101 includes a side wall surface 101*a* and a side wall surface 101*b* rising from the inner surface 71*a* of the bottom part 71 in the axial direction of the barrel part 72, an inner wall surface 101*c* connecting end edge portions of the side wall surfaces 101*a* and 101*b* on the central axis side of the barrel part 72, and a contact surface 101*d* extending by connecting end edge portions of the side wall surfaces 101*a* and 101*b* and the inner wall surface 101*c* on a side opposite to the inner surface 71*a* in the axial direction of the barrel part 72.

Both the side wall surfaces 101*a* and 101*b* extend inward in the radial direction from the inner circumferential surface 72*a* of the barrel part 72 substantially in the radial direction of the barrel part 72. A portion of the side wall surface 101*a* on a side far from the central axis of the barrel part 72 has a planar shape and extends in the radial direction of the barrel part 72, and a portion of the side wall surface 101*a* on a side close to the central axis of the barrel part 72 has a shape of a part of a cylindrical surface that has a central axis on an outer side of the inclined protruding part 93. A portion of the side wall surface 101*b* on a side far from the central axis of the barrel part 72 has a planar shape and extends in the radial direction of the barrel part 72, and a portion of the side wall surface 101*b* on a side close to the central axis of the barrel part 72 has a shape of a part of a cylindrical surface that has a central axis on an inner side of the inclined protruding part 93. A distance between end portions of the side wall surfaces 101*a* and 101*b* of the contact part 101 on a side far from the central axis of the barrel part 72 is the same as a distance between end portions of the pair of side wall surfaces 92*a* of the contact protruding part 92 on a side far from the central axis of the barrel part 72.

The inner wall surface 101*c* has a shape of a part of a cylindrical surface that is coaxial with the inner circumferential surface 72*a* of the barrel part 72. The inner wall surfaces 101*c* of all the contact parts 101 form a shape of a part of the same cylindrical surface that is coaxial with the inner circumferential surface 72*a* of the barrel part 72. The contact surface 101*d* extends parallel to the inner surface 71*a*. A height of the contact surface 101*d* from the inner surface 71*a* of the bottom part 71 is equal to a height of the contact surface 92*c* of the contact protruding part 92 from the inner surface 71*a* of the bottom part 71. The fitting protruding part 91 extending from the inclined protruding part 93 extends to the opening 78 side in the axial direction of the barrel part 72 from a central position of the contact surface 101*d* in the circumferential direction of the barrel part 72.

The inclined part 102 protrudes from the inner wall surface 101*c* of the contact part 101 to the central axis side of the barrel part 72. The inclined part 102 includes an extended wall surface 102*a* and an inclined wall surface 102*b* both rising from the inner surface 71*a* of the bottom part 71 in the axial direction of the barrel part 72, and a stepped surface 102*c* extending by connecting an end edge portion of the extended wall surface 102*a* and the inclined wall surface 102*b* on a side opposite to the inner surface 71*a* in the axial direction of the barrel part 72 and an end edge portion of the inner wall surface 101*c* of the contact part 101 on a side opposite to the contact surface 101*d*.

The extended wall surface 102*a* extends in a planar shape from an end edge portion of the side wall surface 101*a* of the contact part 101 on the central axis side of the barrel part 72 to the central axis side. As shown in FIG. 5, the extended wall surface 102*a* extends along a line connecting a central position of the contact part 101, which forms the same inclined protruding part 93 as the inclined part 102 in which the extended wall surface 102*a* is formed, in the circumferential direction of the barrel part 72 and the central axis of the barrel part 72.

The inclined wall surface 102*b* has a planar shape and connects an end edge portion of the side wall surface 101*b* of the contact part 101 on the central axis side of the barrel part 72 and an end edge portion of the extended wall surface 102*a* on the central axis side of the barrel part 72. Thereby, in the inclined wall surface 102*b*, a distance from the central axis of the barrel part 72 to a first end portion 111, which is an end portion on the side wall surface 101*b* side in the circumferential direction of the barrel part 72, is larger than a distance to a second end portion 112 which is an end portion on the extended wall surface 102*a* side in the circumferential direction of the barrel part 72. In other words, the inclined wall surface 102*b* is inclined with respect to the circumferential direction of the barrel part 72 at a position of the inclined wall surface 102*b*. The stepped surface 102*c* extends substantially parallel to the inner surface 71*a* of the bottom part 71. As shown in FIG. 4, a height of the stepped surface 102*c* of the inclined part 102 from the inner surface 71*a* of the bottom part 71 is slightly lower than a height of the contact surface 101*d* of the contact part 101 from the inner surface 71*a*.

Here, as shown in FIG. 5, the three inclined protruding parts 93 provided in the cover part 75 have the same shape and are disposed at regular intervals in the circumferential direction of the barrel part 72. Therefore, if a disposition direction of the second end portion 112 with respect to the first end portion 111 of one inclined protruding part 93 is referred to as one side in the circumferential direction of the barrel part 72, for all the inclined protruding parts 93 provided in the bumper cap 3, a disposition direction of the second end portion 112 with respect to the first end portion

111 is the one side. As a result, in the bumper cap 3, the first end portions 111 and the second end portions 112 are alternately disposed in the circumferential direction of the bumper cap 3.

From this, the bumper cap 3 includes the plurality of inclined protruding parts 93 in which the inclined wall surfaces 102*b* inclined in the same direction with respect to the circumferential direction of the cover part 75 toward the through hole 81 side of the cover part 75, that is, toward an inner diameter side are formed. In other words, in the bumper cap 3, the inclined parts 102 having the inclined wall surfaces 102*b* inclined in the same direction with respect to the circumferential direction of the bottom part 71 toward the inner diameter side of the bottom part 71 are provided in the plurality of inclined protruding parts 93 provided on the bottom part 71.

In the bumper cap 3, the through hole 81, all the fitting protruding parts 91, all the contact protruding parts 92, and all the inclined protruding parts 93 can be formed by a trimming die that moves in the axial direction of the barrel part 72. Further, the inclined protruding part 93 may be formed separately from other portions of the bumper cap 3 and adhered to the other portions.

The bumper cap 3 having such a configuration is attached to the cylinder 17 when the rod 41 is inserted through the inside of the through hole 81 of the cover part 75 and one end portion of the cylinder 17 from which the rod 41 protrudes is fitted to an inner circumferential side of the barrel part 72 as shown in FIG. 2. At that time, the bumper cap 3 comes into contact with the locking part 36 of the outer tube 14 by the contact surfaces 92*c* of the plurality of contact protruding parts 92 that protrude from the inner surface 71*a* of the bottom part 71 of the cover part 75 at intervals in the circumferential direction of the cover part 75. Also, at that time, the bumper cap 3 comes into contact with the locking part 36 of the outer tube 14 also by the contact surfaces 101*d* of the contact parts 101 of the plurality of inclined protruding parts 93 shown in FIG. 5. Also, at that time, the bumper cap 3 is fitted to an outer circumferential surface of the cylinder 17, that is, an outer circumferential surface of the side wall part 21 of the outer tube 14 with all the fitting protruding parts 91 shown in FIG. 5 to be fixed to the cylinder 17.

In the bumper cap 3 fixed to the cylinder 17 in this way, the cover part 75 covers one end side of the cylinder 17 of the shock absorber main body 2 from which the rod 41 protrudes as shown in FIG. 2. Also, in the bumper cap 3 at this time, the round-shaped through hole 81 is disposed coaxially with the columnar rod 41. In other words, the circular inner circumferential edge portion 82 including the inner circumferential end surface 82*a*, the tapered surface 82*b*, and the stepped surface 82*c* of the bottom part 71 is disposed coaxially with an outer circumferential surface 41*a* of the circular rod 41. Therefore, a distance in the radial direction between the inner circumferential end surface 82*a* and the outer circumferential surface 41*a*, which serves as a flow path for air entering between the bumper cap 3 and the shock absorber main body 2, is constant at all circumferential positions of the bottom part 71 and the rod 41 as shown in FIG. 5.

As shown in FIG. 2, a lower end of the dust boot 65 described above, which is one end in an axial direction thereof, covers an outer circumference of the cover part 75 of the bumper cap 3 fixed to the cylinder 17 and is fitted and fixed to all the flange parts 73 of the cover part 75.

Patent Documents 1 and 2 disclose shock absorbers in which an end portion of a cylinder on a side from which a rod protrudes is covered with a bumper cap. Then, in the shock absorber disclosed in Patent Document 2, the rod and the bumper cap are covered with a bellows-shaped dust boot extending from the vehicle body side to suppress adhesion of dust or the like to the rod. Moreover, Patent Document 2 discloses a structure in which the lower end of the dust boot is fixed to the bumper cap. If the lower end of the dust boot is fixed to the bumper cap in this way, an opening of the lower end of the dust boot is tightened.

If the opening of the lower end of the dust boot is wide, when air in the dust boot is pushed out by the cylinder due to increase in an amount of entry of the cylinder into the dust boot during a compression stroke of the shock absorber, the air can be satisfactorily discharged from the opening of the lower end of the dust boot. Therefore, of the air discharged from the inside of the dust boot, only a small amount of air is discharged through a gap between the bumper cap and the cylinder.

On the other hand, in the first embodiment, the opening of the lower end of the dust boot 65 is tightened by fixing the lower end of the dust boot 65 to the flange part 73 of the bumper cap 3, and thereby adhesion of dust or the like to the rod 41 is further suppressed. Therefore, of the air discharged from the inside of the dust boot 65, an amount of the air discharged through a gap between the bumper cap 3 and the cylinder 17 increases. Therefore, in a bumper cap in which only the plurality of contact protruding parts 92 are disposed at regular intervals on the inner surface 71*a* of the bottom part 71 without providing the inclined protruding parts 93, the air flowing into the through hole 81 from a position between the contact protruding part 92 and the contact protruding part 92 in the circumferential direction of the through hole 81 of the bottom part 71 and trying to flow into a space between the contact protruding part 92 and the contact protruding part 92 generates a vertically rotating (rotating in a plane disposed in the axial direction and radial direction of the bumper cap) vortex, and thereby there is a likelihood that abnormal noise, which is wind noise, will be generated due to the generated vortex.

In the shock absorber 1 of the first embodiment, the inclined parts 102 having the inclined wall surfaces 102*b* inclined in the same direction with respect to the circumferential direction of the bottom part 71 toward the inner diameter side of the bottom part 71 are provided in the plurality of inclined protruding parts 93 provided on the bottom part 71 of the cover part 75 of the bumper cap 3. Therefore, some of air flowed into a space between the inside of the cover part 75 and the shock absorber main body 2 from the outside of the cover part 75 through the through hole 81 flows in from a position of the inclined wall surface 102*b* in the circumferential direction of the through hole 81, and then is branched off into a flow that flows along the inclined wall surface 102*b* toward a space between the inclined protruding part 93 and the contact protruding part 92, passes through a space between adjacent fitting protruding parts 91, and is discharged from the opening 78 of the cover part 75 as shown by the two-dot chain line arrow X1 in FIG. 5, and a flow that flows in the circumferential direction of the bottom part 71 along the inner wall surface 92*b* of the contact protruding part 92 as shown by the two-dot chain line arrow X2 in FIG. 5. Then, as shown by the two-dot chain line arrow X3 in FIG. 5, a flow of the air along the inner wall surface 92*b* of the contact protruding part 92 collides with a vertically rotating vortex of air that flows in from a position between the inclined protruding part 93 and the contact protruding part 92 in the circumferential direction of the through hole 81 and tries to flow into a space between the inclined protruding part 93 and the contact protruding part 92, and disturbs the vortex. Moreover, the plurality of inclined protruding parts 93 provided on the bottom part 71 include the inclined parts 102 having the inclined wall surfaces 102*b* inclined in the same direction with respect to the circumferential direction of the bottom part 71 toward the inner diameter side of the bottom part 71. Thereby, it is possible to suppress generation of abnormal noise caused by the vertically rotating vortex of air generated at positions between all the inclined protruding parts 93 and all the contact protruding parts 92 in the circumferential direction of the through hole 81.

That is, in the shock absorber 1, the inclined protruding parts 93 suppress rotation (vertical rotation) of air, which is a fluid having flowed into a space between the inside of the cover part 75 and the shock absorber main body 2 from the outside of the cover part 75 through the through hole 81, in the cover part 75. Thereby, generation of abnormal noise can be suppressed.

Also, in the shock absorber 1, a flow of the air along the inclined wall surface 102*b* becomes a flow that extends outward in the circumferential direction of the through hole 81, but a fluid velocity thereof varies depending on a circumferential position of the through hole 81 due to an inclination of the inclined wall surface 102*b*. This also causes a turbulent flow in a flow of the air, leading to suppression of generation of abnormal noise.

That is, in the shock absorber 1, the inclined protruding parts 93 adjust the air which is a fluid having flowed into the inside of the cover part 75 from the outside of the cover part 75 through the through hole 81 so that a velocity of the fluid extending outward in the circumferential direction of the through hole 81 varies depending on a circumferential position of the through hole 81. Thereby, generation of abnormal noise can be suppressed.

Moreover, the shock absorber 1 has a simple structure in which the inclined parts 102 having the inclined wall surfaces 102*b* inclined in the same direction with respect to the circumferential direction of the bottom part 71 toward the inner diameter side of the bottom part 71 are provided in the plurality of inclined protruding parts 93 provided on the bottom part 71, and thereby can suppress generation of abnormal noise.

In addition, since an outer circumference of the cover part 75 is covered with the dust boot 65 that covers at least a part of the rod 41, and the cover part 75 is fixed to one end of the dust boot 65, adhesion of dust or the like to the rod 41 can be suppressed. Also, since the structure is such that the cover part 75 is fixed to one end of the dust boot 65, a flow rate of the air flowed into a space between the inside of the cover part 75 and the shock absorber main body 2 from the outside of the cover part 75 through the through hole 81 is configured to be increased, a possibility of generation of abnormal noise increases. Therefore, there is a high need for suppressing abnormal noise.

In the bumper cap 3, the through hole 81, all the fitting protruding parts 91, all the contact protruding parts 92, and all the inclined protruding parts 93 can be formed by a trimming die that moves in the axial direction of the barrel part 72, and thus these can be easily formed. Therefore, generation of abnormal noise can be easily suppressed.

Since the bumper cap 3 can suppress generation of abnormal noise by its own structure without involving a change of the shock absorber main body 2, generation of abnormal noise can be easily suppressed.

Second Embodiment

A second embodiment according to the present invention will be described mainly on the basis of FIG. 6, focusing on differences from the first embodiment. Further, parts common to those in the first embodiment will be denoted by the same terms and the same reference signs.

Figure 6:
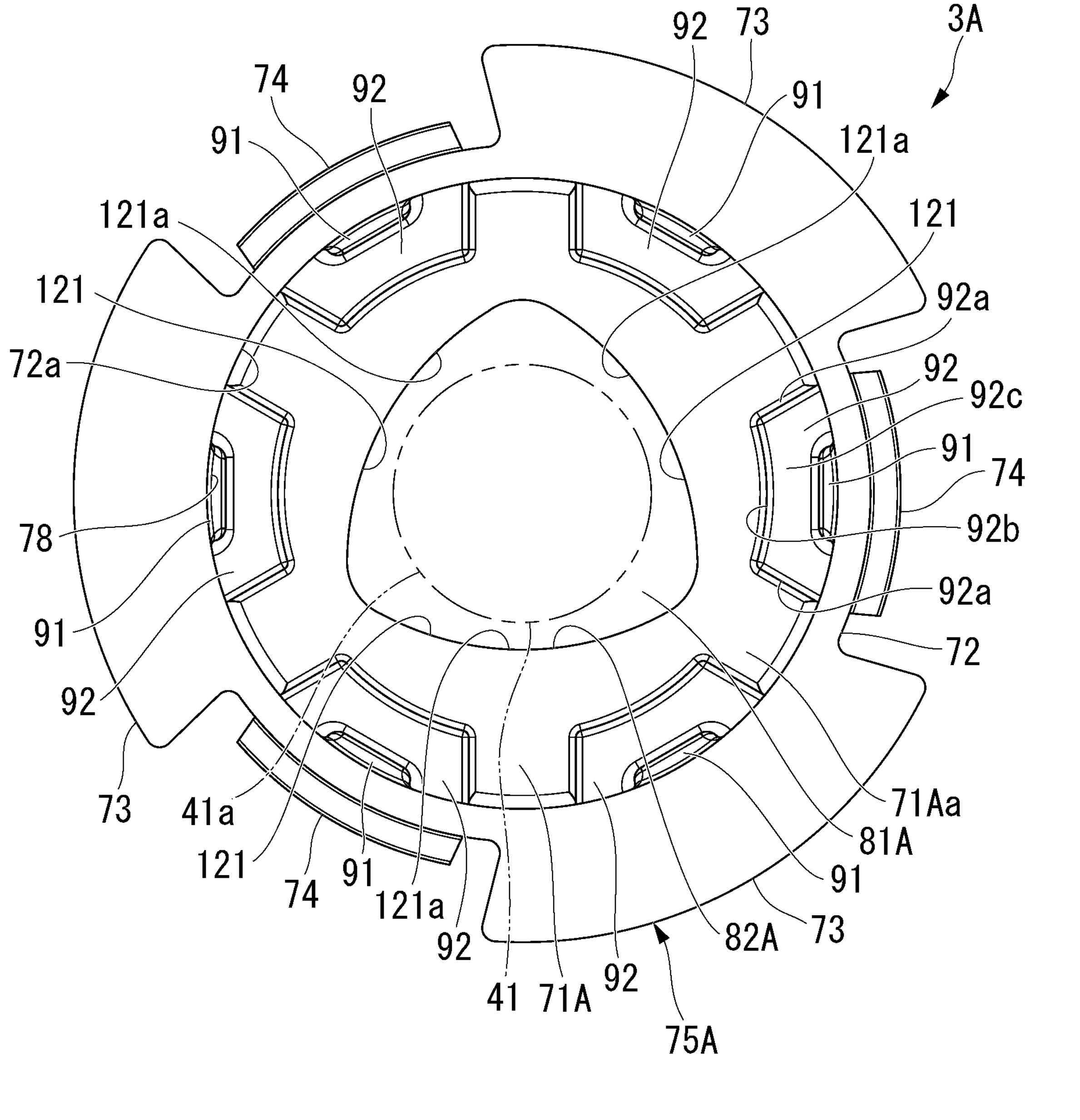
FIG. 6 is a bottom view showing a bumper cap of a second embodiment of the present invention.

In the second embodiment, as shown in FIG. 6, a bumper cap 3A which is partially different from the bumper cap 3 of the first embodiment is used instead of the bumper cap 3.

The bumper cap 3A is also an integrally molded product made of a synthetic resin. In the bumper cap 3A, a cover part 75A is partially different from the cover part 75 of the first embodiment, and specifically, a bottom part 71A is partially different from the bottom part 71.

The bottom part 71A has a bored disc shape, and has a through hole 81A formed to penetrate in an axial direction at a center in a radial direction. The through hole 81A is a deformed hole having a non-circular cross section on a plane orthogonal to a central axis thereof. In other words, an inner circumferential edge portion 82A of the bottom part 71A forming the through hole 81A is different in shape that is not circular. Therefore, the bottom part 71A has an inner surface 71Aa in which a shape of a portion of the through hole 81A is different from that of the inner surface 71*a*.

The inner circumferential edge portion 82A of the bottom part 71A has a plurality, specifically three, of arcuate parts 121 (suppression parts, fluid adjustment parts) whose centers are on a side farther from a center of the bottom part 71A. These arcuate parts 121 are all arcuate with the same diameter and are disposed at regular intervals in a circumferential direction of the bottom part 71A. That is, the arcuate parts 121 each have an arcuate shape in which an inner end surface 121*a* forming the through hole 81A has a center on a side farther from the center of the bottom part 71A. The inner end surfaces 121*a* of the three arcuate parts 121 are all arcuate with the same diameter, positioned at equal distances from the center of the bottom part 71A, and disposed at regular intervals in the circumferential direction of the bottom part 71A.

Also, in the bumper cap 3A, a contact protruding part 92 is formed instead of the inclined protruding part 93 of the first embodiment. That is, the bumper cap 3A includes a plurality, specifically six, of contact protruding part 92 having the same shape. These contact protruding parts 92 are provided on the bottom part 71A and a barrel part 72 of the cover part 75A. These contact protruding parts 92 are disposed at regular intervals in the circumferential direction of the bottom part 71A and the barrel part 72. A gap is formed between adjacent contact protruding parts 92 in the circumferential direction of the barrel part 72.

The number of the contact protruding parts 92 is twice the number of the arcuate parts 121. Then, in the circumferential direction of the bottom part 71A, a central position of the arcuate part 121 and a central position between adjacent contact protruding parts 92 are aligned in position. Also, a boundary position between adjacent arcuate parts 121 and a central position between adjacent contact protruding parts 92 are aligned in position.

Also in the bumper cap 3A, the through hole 81A, all fitting protruding parts 91, and all the contact protruding parts 92 can be formed by a trimming die that moves in the axial direction of the barrel part 72.

The bumper cap 3A having such a configuration is attached to a cylinder 17 when a rod 41 is inserted through the inside of the through hole 81A of the cover part 75A and one end portion of the cylinder 17 from which the rod 41 protrudes is fitted to an inner circumferential side of the barrel part 72. At that time, the bumper cap 3A comes into contact with a locking part 36 of an outer tube 14 by contact surfaces 92*c* of the plurality of contact protruding parts 92 that protrude from the inner surface 71Aa of the bottom part 71A of the cover part 75A at intervals in the circumferential direction of the cover part 75A. Also, at that time, the bumper cap 3A is fitted to an outer circumferential surface of the cylinder 17, that is, an outer circumferential surface of a side wall part 21 of the outer tube 14 with all the fitting protruding parts 91 to be fixed to the cylinder 17.

In the bumper cap 3A fixed to the cylinder 17 in this way, the cover part 75A covers one end side of the cylinder 17 of a shock absorber main body 2 from which the rod 41 protrudes. Also, in the bumper cap 3A at this time, the deformed-shaped through hole 81A is disposed coaxially with the columnar rod 41. In other words, the inner circumferential edge portion 82A of the bottom part 71A provided on the bottom part 71A of the cover part 75A to form the through hole 81A is disposed coaxially with an outer circumferential surface 41*a* of the circular rod 41.

Then, since the inner circumferential edge portion 82A of the bottom part 71A is formed of the plurality of arcuate parts 121, a distance in the radial direction between the inner end surface 121*a* of each of the plurality of arcuate parts 121 of the inner circumferential edge portion 82A and the outer circumferential surface 41*a* of the rod 41, which serves as a flow path for air entering between the bumper cap 3A and the shock absorber main body 2, varies depending on a circumferential position of the bottom part 71A.

That is, in the circumferential direction of the bottom part 71A and the rod 41, a distance in the radial direction between the inner end surface 121*a* and the outer circumferential surface 41*a* is the smallest at the central position of the inner end surface 121*a* of the arcuate part 121, the distance in the radial direction between the inner end surface 121*a* and the outer circumferential surface 41*a* becomes larger with distance away from the central position, and the distance in the radial direction between the inner end surface 121*a* and the outer circumferential surface 41*a* is the largest at a position of an end portion of the inner end surface 121*a*.

Thus, the plurality of arcuate parts 121 of the inner circumferential edge portion 82A forming the through hole 81A of the bottom part 71A of the cover part 75A are formed so that a distance from the rod 41 varies depending on a circumferential position.

In the second embodiment, the inner circumferential edge portion 82A forming the through hole 81A of the bottom part 71A of the cover part 75A is formed so that the distance from the rod 41 varies depending on a circumferential position due to the plurality of arcuate parts 121. Therefore, air having flowed into a space between the inside of the cover part 75A and the shock absorber main body 2 from the outside of the cover part 75A through the through hole 81A has a different fluid velocity depending on a circumferential position of the through hole 81A. That is, the flow velocity is low at the position of the end portion of the inner end surface 121*a* at which a distance in the radial direction between the inner end surface 121*a* and the outer circumferential surface 41*a* is the largest, and the flow velocity is high at the central position of the inner end surface 121*a* at which a distance in the radial direction between the inner end surface 121*a* and the outer circumferential surface 41*a* is the smallest. In other words, the plurality of arcuate parts 121 of the inner circumferential edge portion 82A forming the through hole 81A of the bottom part 71A of the cover part 75A adjust the air which is a fluid having flowed into the inside of the cover part 75A from the outside of the cover part 75A through the through hole 81A so that a velocity of the fluid extending outward in the circumferential direction of the through hole 81A varies depending on a circumferential position of the through hole 81A. Thereby, generation of abnormal noise can be suppressed.

Moreover, generation of abnormal noise can be suppressed with a simple structure in which the inner circumferential edge portion 82A forming the through hole 81A of the bottom part 71A of the cover part 75A is formed so that the distance from the rod 41 varies depending on a circumferential position.

In the bumper cap 3A, the through hole 81A, all the fitting protruding parts 91, and all the contact protruding parts 92 can be formed by a trimming die that moves in the axial direction of the barrel part 72, and thus these can be easily formed. Therefore, generation of abnormal noise can be easily suppressed.

Since the bumper cap 3A can suppress generation of abnormal noise by its own structure without involving a change of the shock absorber main body 2, generation of abnormal noise can be easily suppressed.

A bumper cap of a first aspect of the embodiment described above is a bumper cap attached to a shock absorber main body, and includes a cover part having an opening at one end, having a bottom part and a through hole penetrating the bottom part at the other end, and configured to cover the shock absorber main body, and a plurality of protruding parts protruding from the bottom part of the cover part toward the opening side, and in which a gap is formed between adjacent protruding parts, in which a suppression part suppressing rotation of a fluid, which has flowed into a space between the inside of the cover part and the shock absorber main body from the outside of the cover part through the through hole, in the cover part is further provided. Thereby, generation of abnormal noise can be suppressed.

According to a bumper cap of a second aspect of the embodiment, in the bumper cap of the first aspect, a rod of the shock absorber main body is inserted through the through hole, the suppression part is provided at an inner circumferential edge portion forming the through hole of the bottom part and is formed so that a distance between the rod and the inner circumferential edge portion of the bottom part varies depending on a position in a circumferential direction.

A bumper cap of a third aspect of the embodiment is a bumper cap attached to a shock absorber main body, and includes a cover part having an opening at one end, having a bottom part and a through hole penetrating the bottom part at the other end, and configured to cover the shock absorber main body, and a plurality of protruding parts protruding from the bottom part of the cover part toward the opening side and in which a gap is formed between adjacent protruding parts, in which inclined parts inclined in the same direction with respect to a circumferential direction of the bottom part toward an inner diameter side of the bottom part are provided in the plurality of protruding parts provided on the bottom part. Thereby, generation of abnormal noise can be suppressed.

A shock absorber of a fourth aspect of the embodiment is a shock absorber having a cylinder and a rod extending from one end side of the cylinder, and includes a cover part in which a through hole through which the rod is inserted is formed and which covers one end side of the cylinder, a plurality of protruding parts protruding from an inner surface of the cover part at intervals in a circumferential direction of the cover part, and a fluid adjustment part adjusting a fluid having flowed into the inside of the cover part from the outside of the cover part through the through hole so that a velocity of the fluid extending outward in the circumferential direction of the through hole varies depending on a position in the circumferential direction of the through hole. Thereby, generation of abnormal noise can be suppressed.

According to a shock absorber of a fifth aspect of the embodiment, in the shock absorber of the fourth aspect, the fluid adjustment part is provided at an inner circumferential edge portion forming the through hole of the bottom part and is formed so that a distance between the rod and the inner circumferential edge portion of the bottom part varies depending on a position in the circumferential direction.

According to a shock absorber of a sixth aspect of the embodiment, in the shock absorber of the fourth aspect, the fluid adjustment part includes a plurality of inclined protruding parts provided in the cover part and inclined in the same direction with respect to the circumferential direction of the cover part toward an inner diameter side of the cover part.

According to a shock absorber of a seventh aspect of the embodiment, in the shock absorber of the fourth to sixth aspects, an outer circumference of the cover part is covered with a dust boot which covers at least a part of the rod, and the cover part is fixed to the dust boot.

INDUSTRIAL APPLICABILITY

According to the bumper cap and the shock absorber according to each aspect of the present invention, it is possible to suppress generation of abnormal noise.

REFERENCE SIGNS LIST

- 1 Shock absorber
- 2 Shock absorber main body
- 3, 3A Bumper cap
- 17 Cylinder
- 41 Rod
- 65 Dust boot
- 71, 71A Bottom part
- 71*a*, 71Aa Inner surface
- 75, 75A Cover part
- 78 Opening
- 81, 81A Through hole
- 82, 82A Inner circumferential edge portion
- 92 Contact protruding part (protruding part)
- 93 Inclined protruding part (protruding part)
- 102 Inclined part (suppression part, fluid adjustment part)
- 121 Arcuate part (suppression part, fluid adjustment part)

The invention claimed is:

1. A bumper cap, which is to be attached to a shock absorber main body, comprising:

a cover part having an opening at one end, having a bottom part and a through hole penetrating the bottom part at another end, and configured to cover the shock absorber main body;

a plurality of protruding parts protruding from the bottom part of the cover part toward the opening side and in which a gap is formed between the adjacent protruding parts; and a suppression part configured to suppress a rotation of a fluid, which has flowed into a space between the inside of the cover part and the shock absorber main body from an outside of the cover part through the through hole, in the cover part, wherein a rod of the shock absorber main body is inserted through the through hole, and wherein the suppression part is provided at an inner circumferential edge portion forming the through hole of the bottom part, and is formed so that a distance between the rod and the inner circumferential edge portion of the bottom part varies depending on a position in a circumferential direction.

2. A bumper cap, which is to be attached to a shock absorber main body, comprising:

a cover part having an opening at one end, having a bottom part and a through hole penetrating the bottom part at another end, and configured to cover the shock absorber main body; and a plurality of protruding parts protruding from the bottom part of the cover part toward the opening side and in which a gap is formed between the adjacent protruding parts, wherein inclined parts inclined in a same direction along an inclined direction intersecting a circumferential tangent of the bottom part toward an inner diameter side of the bottom part are provided in the plurality of protruding parts provided on the bottom part.

3. A shock absorber including a cylinder and a rod extending from one end side of the cylinder, comprising:

a cover part in which a through hole through which the rod is inserted is formed and which covers one end side of the cylinder;

a plurality of protruding parts protruding from an inner surface of the cover part at intervals in a circumferential direction of the cover part; and a fluid adjustment part configured to adjust a fluid having flowed into an inside of the cover part from an outside of the cover part through the through hole so that a velocity of the fluid extending outward in the circumferential direction of the through hole varies depending on positions in the circumferential direction of the through hole, wherein the fluid adjustment part is provided at an inner circumferential edge portion forming the through hole of the cover part, and is formed so that a distance between the rod and the inner circumferential edge portion of the cover part varies depending on positions in the circumferential direction.

4. The shock absorber according to claim 3, wherein an outer circumference of the cover part is covered with a dust boot which covers at least a part of the rod, and the cover part is fixed to the dust boot.

5. A shock absorber including a cylinder and a rod extending from one end side of the cylinder, comprising:

a cover part in which a through hole through which the rod is inserted is formed and which covers one end side of the cylinder;

a plurality of protruding parts protruding from an inner surface of the cover part at intervals in a circumferential direction of the cover part; and a fluid adjustment part configured to adjust a fluid having flowed into an inside of the cover part from an outside of the cover part through the through hole so that a velocity of the fluid extending outward in the circumferential direction of the through hole varies depending on positions in the circumferential direction of the through hole, wherein the fluid adjustment part includes a plurality of inclined protruding parts provided in the cover part and inclined in a same direction along an inclined direction intersecting the circumferential direction tangent of the cover part toward an inner diameter side of the cover part.

6. The shock absorber according to claim 5, wherein an outer circumference of the cover part is covered with a dust boot which covers at least a part of the rod, and the cover part is fixed to the dust boot.

* * * * *